Inventor;
Frank E. Thomes
by J. W. Bates
Atty

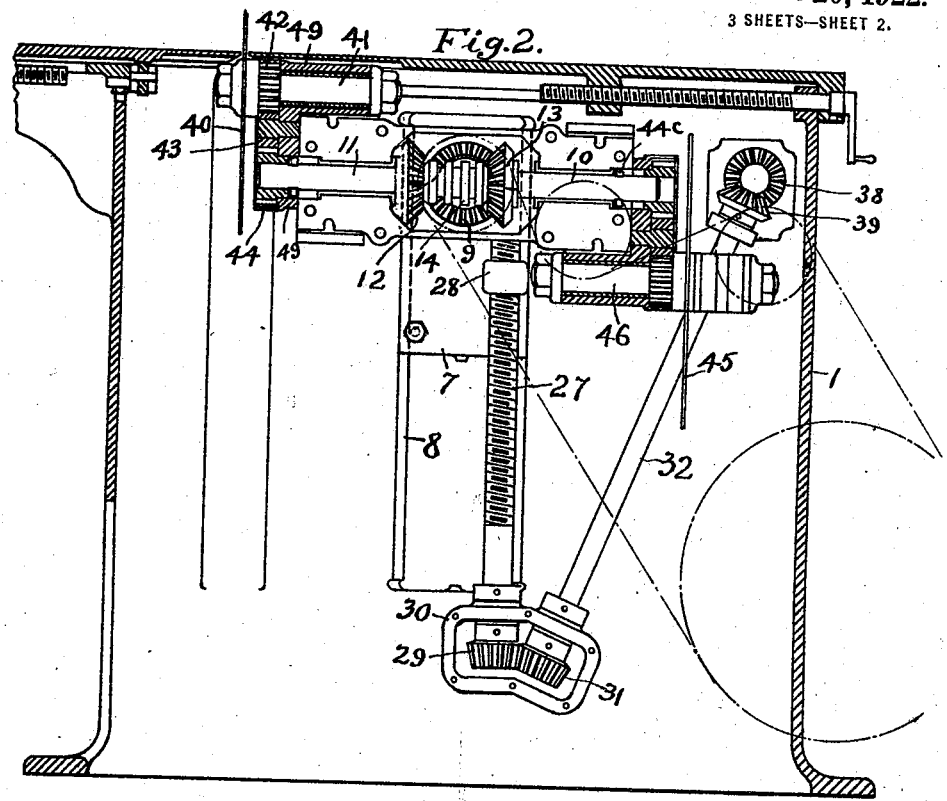
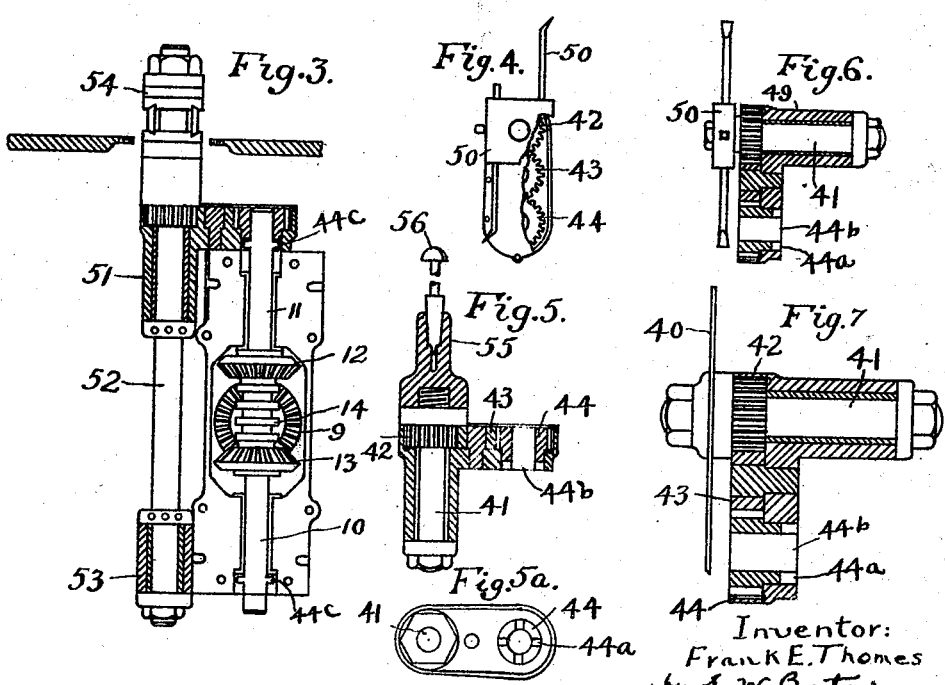

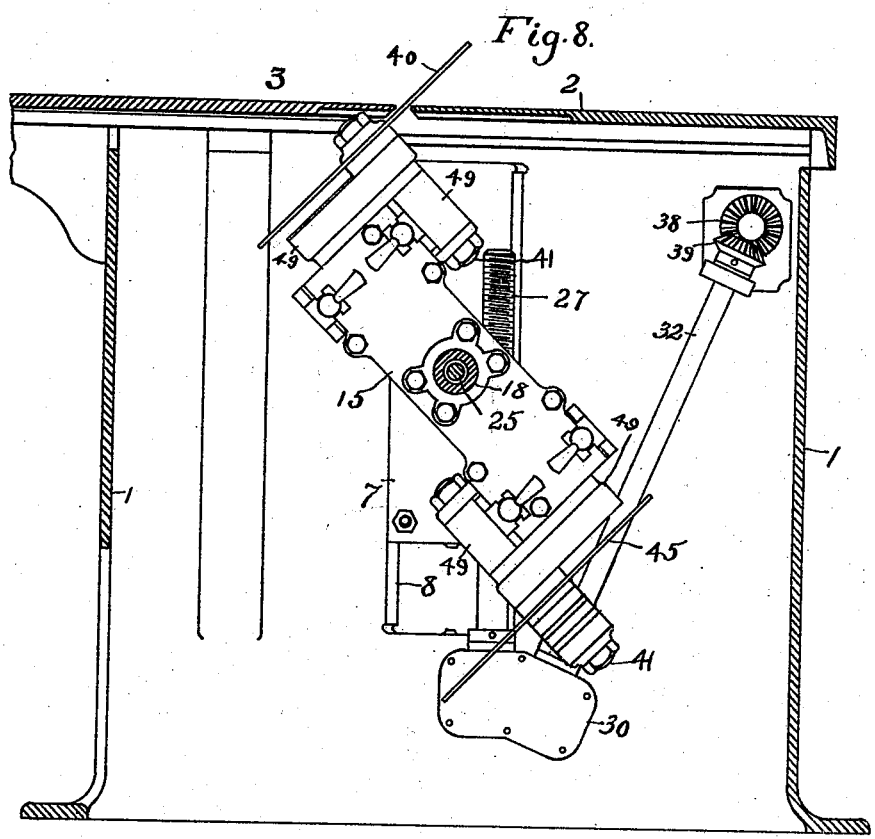

UNITED STATES PATENT OFFICE.

FRANK E. THOMES, OF PORTLAND, MAINE.

CONVERTIBLE WOODWORKING MACHINE.

1,420,591.  Specification of Letters Patent.  Patented June 20, 1922.

Application filed October 6, 1920. Serial No. 415,038.

*To all whom it may concern:*

Be it known that I, FRANK E. THOMES, a citizen of the United States, residing at 58 Fore Street, Portland, in the county of Cumberland and State of Maine, have invented certain new and useful Improvements in Convertible Woodworking Machines, of which the following is a specification.

My invention relates to a wood working machine capable of doing a variety of work and making use of rotary cutters.

In my Patent No. 824,962 dated July 3, 1906, I show a core box cutter adapted to cut grooves of varying widths by means of cutters rotating in a vertical plane.

In my pending application No. 268,928, filed Dec. 30, 1918, I show an attachment for my original core box cutter whereby it is capable of using an irregular molder head rotating in a horizontal plane.

My experience with the core box cutter machines has been that there were comparatively few shops where they would have sufficient use for a core box cutter to pay for the expense of buying it and of sparing the room it would take up.

The object of my present invention is to combine a core box cutter capable of cutting cylindrical grooves of any desired width, an irregular molder and a sawing machine where a splitting and a cutting off saw may be very quickly brought into action.

According to my present invention, I provide a main shaft having thereon a main gear, with a pair of counter shafts, each of which has a gear on its inner end adapted to engage when required, the main gear, the bearing of the main shaft and the counter shafts being connected in such a way that the whole mechanism may be rotated with the main shaft as a center to reverse the saws and bring the other cutters into desired positions.

A cutter arbor carrying a rotatable cutter and preferably removable, is journalled alongside of each counter shaft and connected therewith by suitable gears.

As I prefer to construct the machine, the main gear is a beveled gear, the two counter shafts are in line or in practice formed by a single shaft, each end of which forming one of the counter shafts and the counter shafts are longitudinally movable so that either gear may be slipped into engagement with the main gear to run the counter shaft in either direction. Means are provided for raising and lowering the whole structure so that the saws and cutters may be raised and lowered to their proper position with respect to the table of the machine.

The various tool arbors and the gearing by which they connect with the counter shafts are made as self contained brackets which may be taken off and put on according to the cutter used.

I have illustrated my invention by means of the accompanying drawing in which,

Fig. 2 shows a section on the line 1—1 of Fig. 1 with certain portions in elevation, Fig. 3 is a central longitudinal section through the counter-shafts showing the latter in a vertical position with an irregular molder projecting through the table.

Fig. 4 is an end elevation of a rotary cutter bracket with portions cut away,

Fig. 5 is a tool bracket showing a vertical cutter head suitable for cutting small grooves.

Figure 1:
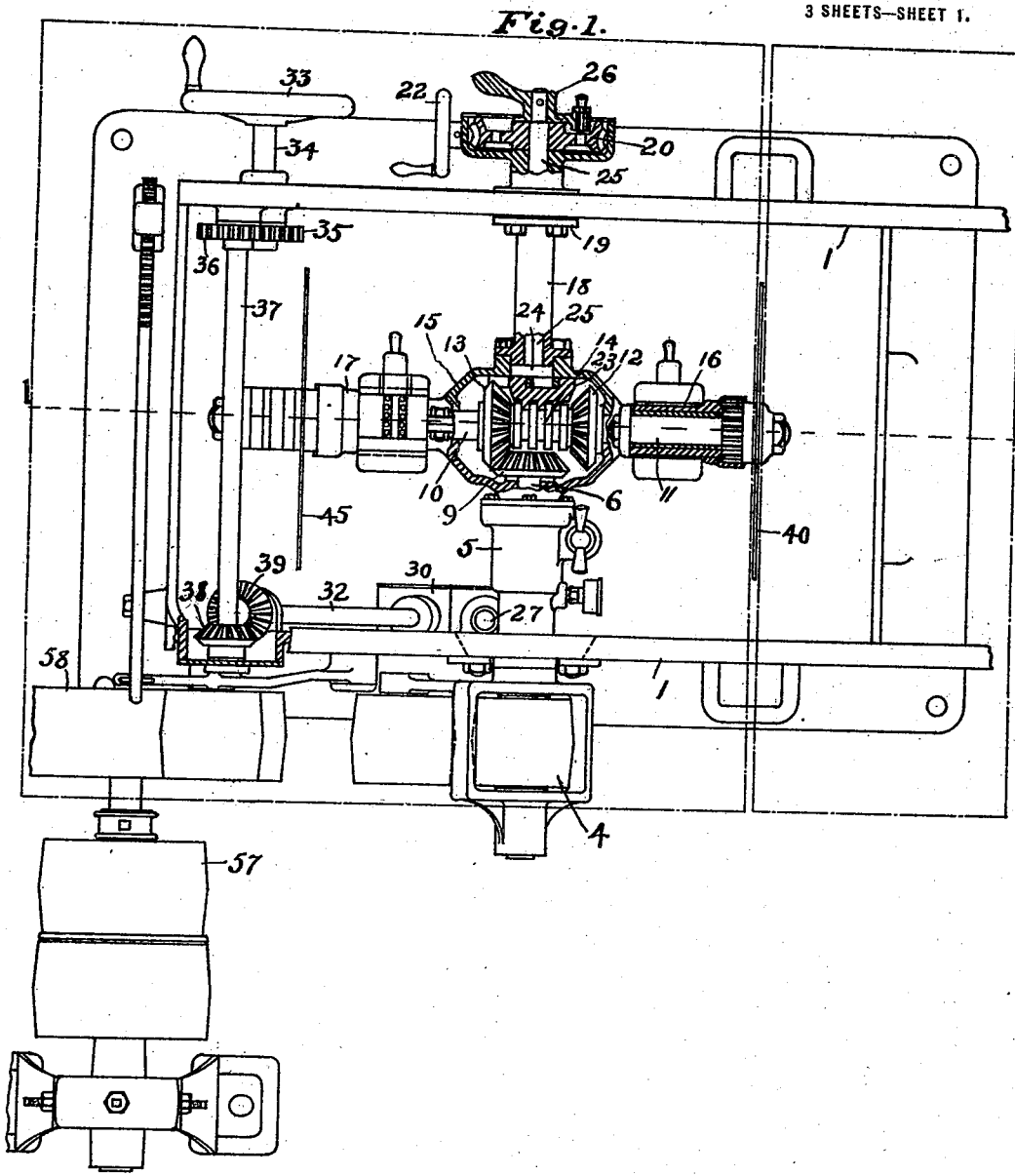
Fig. 1 shows a plan of my machine with the outline of the table indicated in dotted lines.
Figure 9:
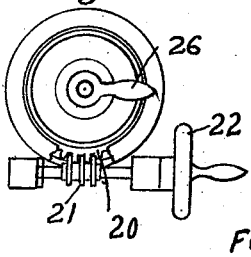

Fig. 5ª is an end elevation of the bracket as shown in Fig. 5,

Fig. 6 is the tool bracket in longitudinal section as shown in Fig. 4,

Fig. 7 is a saw bracket in longitudinal section showing a saw in position,

Fig. 8 is an elevation of the operative parts of the machine rotated to a position of about 45 degrees from the horizontal or normal position of the counter shaft and, Fig. 9 is an elevation of the worm gear for rotating the bearings on the main shaft.

In the drawing similar letters indicate similar parts.

While I have shown this machine in considerable detail and in the form which I consider preferable it will be understood that the machine herein shown is simply illustrative and that numerous other forms can be made embodying my invention as set forth in the appended claims.

The machine is mounted on a standard or framework 1 in the form of an enclosing box with upright sides with a table top in two parts 2 and 3, sliding on suitable guides so that a suitable opening or slot may be formed between the two sections to allow the saws or other cutting tools to project up through the table and above its surface.

Suitable guides may be used on the table top as in other kinds of wood working machines for guiding the work being operated upon by the rotary cutters.

Power is directly applied to the working parts of the machine through a main shaft 6 having on its outer end a pulley 4 driven by a belt connection which will allow it to be raised and lowered.

The shaft 6 is journalled in an elongated bearing 5 secured to a carriage 7 adapted to slide vertically on the guides or ways 8 formed as shown as a part of the framework of the machine.

Means are provided on the main shaft for conveying power to a pair of counter shafts extending in opposite directions from the main shaft and here shown as a single shaft, the two ends of the counter shafts operating to transmit the power to tool arbors journalled in suitable brackets.

As herein shown, a main bevel gear 9 is secured on the inner end of the main shaft and the two opposing counter shafts 10 and 11 constitute in practice a single counter shaft extending across the inner end of the main shaft and carrying a pair of auxiliary bevel gears 12 and 13 united by a corrugated sleeve 14.

The gears 12 and 13 and the sleeve 14 are secured to the counter shafts 10 and 11 and the gears are separated far enough so that by a longitudinal movement of the sleeve 14 and connecting counter shafts, either one of the gears 12 and 13 may be brought into engagement with the main gear 9 or to a central position where neither gear will engage.

A hollow casing 15 encloses the gears 9, 12 and 13 connecting with the outer end of the bearing 5 and the bearings 16 and 17 within which the counter shafts are journalled extend out in opposite directions from the hollow casing 15.

The three bearings and the hollow casing 15 thus form a rigid member which may be rotated about the main shaft as a center to place the counter shafts in any desired radial position.

The rotation of the casing 15 and its adjoining parts around the main shaft is effected by a hollow shaft or sleeve 18 secured to one side of the casing 15 and in a line continuous with the main shaft. It passes through one wall of the supporting frame and is journalled in a slide 19 which is adapted to move vertically in guides formed in the frame of the machine so that it follows any vertical movement which may be given to the carriage 7 and the other parts of the rigid casing.

The rotation of the casing and of the sleeve 18 are effected by a worm gear 20 secured to the outer end of the sleeve beyond the slide or bearing 19. The worm gear is rotated by a worm 21 operated by a hand wheel 22. By means of the hand wheel 22 it is evident that the rotation of the casing can be very accurately effected.

Means are provided for effecting the longitudinal movement of the sleeve 14 and the double countershaft to bring one or the other of the gears 12 and 13 into engagement with the main gear 9 or into a central position where neither will be in engagement.

For this purpose I form on the sleeve 14 annular ribs or corrugations which fit similar grooves in a sliding block 23 held in horizontal guides on the interior of the casing 15. This block 23 is moved horizontally by an eccentric 24 on the end of an operating shaft 25 which extends centrally through the hollow shaft or sleeve 18. The outer end of the shaft 25 extends beyond the end of the sleeve 18 and on the outer end of the shaft is secured a handle 26 by which the shaft may be turned entirely around and the gears 12 and 13 thrown into and out of gear with the main gear 9 and the counter shafts moved correspondingly.

Means are provided for moving the casing 15 and its connections vertically and for this purpose, I provide a vertical screw 27 engaging a nut 28 attached to the carriage 7.

The lower end of the screw 27 is journalled in a suitable bearing 30 in the lower portion of the machine and at the lower end of the screw is a bevel gear 29 which engages a similar bevel gear 31 on the lower end of an incline shaft 32 which extends upward to a point a short distance below the table. The shaft 32 and the screw 27 are operated by a hand wheel 33 secured to the end of the short shaft 34 journalled in the frame of the machine and having a spur gear 35 on its inner end engaging a spur gear 36 secured on a horizontal shaft 37 extending across the machine.

At the other ends of the shaft 37 is a bevel gear 38 engaging a bevel gear 39 on the upper end of the shaft 32.

It will thus be seen that the screw 27 may be rotated and the operative parts of the machine raised and lowered by turning the hand wheel 33.

Rotating cutters of various kinds are connected with the two counter shafts by gear connections and as here shown, the rotating cutters which may be circular saws, irregular molders or plain rotary cutters are mounted in removable brackets which may be attached to the bearing casings in which the counter shafts are journalled.

The cutting tools are secured to the ends of two cutter arbors journalled in the bearing casings parallel with the counter shafts.

Referring to Fig. 2 I show a circular saw 40 secured on the end of a cutter arbor 41 which is mounted permanently in a removable bracket made up of bearings 49 for the cutter arbor 41 and the several gears 42, 43 and 44 by which the cutter arbor 41 is connected to the outer end of the counter shaft 11.

The small gear or pinion 44 has a central opening 44$^b$ (Fig. 5) in which the end of the counter shaft 10 or 11 slides and around the edge of the opening are formed a series of clutch recesses 44$^a$ which are adapted to engage clutch projection 44$^c$ on the counter shafts. The end of the counter shafts and the face of the pinion 44 thus form the two elements of a clutch. The outer ends of the counter shafts 10 and 11 are so located that when one is in engagement with one of the pinions 44, the other is out of engagement with the opposite pinion 44 and thus only one of the saw or cutter arbors can be rotated at one time.

The gear 44 is secured to the end of the counter shaft 11, the gear 42 is secured to the cutter arbor 41 and the gear 43 is an intermediate gear for transmitting power from the gear 44 to the gear 42.

The saw 40 as shown in Fig. 2 is shown in operative position extending up through the opening in the table and a saw 45 is shown connected with the counter shaft 10 by a connection with the pinion 44 similar in all respects to that shown in case of the saw 40 except that the two arbors 41 and 46 are on opposite sides of the counter shaft so that while the saw 40 is in its upper position where it can be used in connection with the table, the saw 45 is down and out of the way beneath the surface of the table.

It will be readily seen that by sliding the table top out of the way the whole arrangement can be reversed and turned on the main shaft as a center so that the saw 45 will occupy the place of the saw 40 and be available of use.

It is designed that one of the saws shall be a cutting off saw and the other a splitting saw so that either can be used as desired whenever necessary.

The bracket is secured to the main casing by suitable fastening devices and the various brackets are secured interchangeably on the main casing by suitable clamps.

Instead of having the circular saw 40 secured to the cutter arbor 41, I may make use of a cutter as 50 operating in a vertical plane the same as the circular saw, this arrangement being shown in Figs. 4 and 6.

In Fig. 8 I have shown the main casing partially rotated so as to bring the saw 40 at an angle of 45 degrees from the horizontal. The saw may be rotated to cut any desired bevel this being one of the most convenient features of my device.

In Fig. 3 I have shown an arrangement for using an irregular molder with its arbor in a vertical position and rotating in a horizontal plane.

In this case the bracket 51 and the cutter arbor 52 are of length sufficient to include the length of the two counter shafts from one end to the other. The arbor bearing is in two parts, the upper part of 51 being attached to one end of the main casing 15 and the other portion 53 being attached to the other end of the main casing with the cutter head 54 at the upper end of the arbor 52.

The main casing is rotated so that the double counter shaft comes in a vertical position. The bearings of the irregular molder are thus quite widely separated and are made sufficiently strong to stand the strain of the great speed required. The connecting gears for transmitting power from the counter shaft to the cutting arbor are just the same as explained in Fig. 2 which characterize all the brackets. The rotation of the cutter head 54 can be changed by operating the handle 26 and the sleeve 14 as already explained.

In Fig. 5 I have shown a small irregular molder 56 held in a socket 55 secured at the upper end of the cutter arbor 41, the parts being in the same relative position as in Fig. 3.

The cutter head 56 is capable of cutting a narrow groove in the wood and by suitably shaping this cutter head grooves of many sizes and cross sections may be made.

The source of power for the machine are the pulleys 57, 58 and the pulley 4 already spoken of which is attached to the main shaft 6 with the guide and tightening pulleys so that the main shaft 6, its bearing 5 and all the connecting parts may be moved vertically while the driving belt remains taut.

I claim:

1. In a wood working machine, the combination of a main shaft, a main gear on said shaft, a pair of counter shafts, each having on its inner end a pinion adapted to engage said gear, connected bearings for said shafts, a rotating cutter operated by each of said counter shafts and means for rotating the said bearings about the main shaft to change the position of said cutters.

2. In a wood working machine, the combination of a main shaft, a main gear on said shaft, a pair of counter shafts each having on its inner end a pinion adapted to engage said gear, connecting bearings for said shafts, rotating cutters operated by said counter shafts, means for rotating said bearings about the main shaft and means for moving the said bearings vertically to change the position of said cutters.

3. In a wood working machine, the combination of a main shaft, a main bevel gear on said shaft, a pair of counter shafts, an auxiliary bevel gear on the inner end of each of said counter shafts adapted to engage said main bevel gear, means for bringing each of said bevel gears separately into engagement with said main bevel gear, rotating cutters operated by said counter shafts, connecting bearings for said shaft and means for rotating said bearings about the main shaft to change the position of said cutters.

4. In a wood working machine, the combination of a main shaft, a main bevel gear on the end of said shaft, a double counter shaft extending across the end of said main shaft, a pair of auxiliary bevel gears connected to said counter shaft, means for sliding said counter shaft longitudinally to bring said auxiliary bevel gears separately into engagement with said main bevel gear, connected bearings for said shafts, rotating cutters operated by the counter shaft and means for rotating said bearings about the main shaft to change the position of said cutters.

5. In a wood working machine, the combination of a main shaft, a main gear on said shaft, a pair of counter shafts, a pinion on the inner end of each of said counter shafts adapted to separately engage said main gear, connecting bearings for said shafts, rotatable cutters operated by said counter shafts, a rotating shaft in line with said main shaft and connected with said bearings and means for turning said rotating shaft to change the position of said cutters.

6. In a wood working machine, the combination of a main shaft, a main gear on said shaft, a pair of counter shafts, a pinion on the inner end of each of said counter shafts adapted to separately engage said main gear, connecting bearings for said shafts, rotatable cutters operated by said counter shafts, a rotating shaft in line with said main shaft and connected with said bearings, a worm gear on said rotating shaft and a hand operated worm for operating said worm gear to change the position of said cutters.

7. In a wood working machine, the combination of a main shaft, a main bevel gear on the end thereof, a double counter shaft extending across the end of said main shaft, cutters operated by the ends of said counter shaft, auxiliary bevel gears secured on said double counter shaft and adapted to separately engage said main bevel gear, an adjusting sleeve connecting said auxiliary gears, connecting bearings for said shafts, a hollow rotating shaft in line with the main shaft and connecting with said bearings, hand operated gearing for rotating said hollow shaft, a reversing shaft extending through said hollow shaft for sliding said sleeve and counter shaft longitudinally to reverse the motion of said cutters.

8. In a wood working machine, the combination of a main shaft, a main gear for said shaft, a pair of counter shafts, a pair of auxiliary gears adapted to engage separately said main gear on the inner end of said counter shafts, connecting bearings for said shafts, rotatable cutters operated by said counter shafts, means for rotating said bearings about the main shaft, a vertically movable carriage for supporting said bearings and shaft, guides for said carriage and means for raising and lowering said carriage.

9. In a wood working machine, the combination of a main shaft, a main gear for said shaft, a pair of counter shafts, a pair of auxiliary gears adapted to engage separately said main gear on the inner end of said counter shafts, connected bearings for each of said shafts, a carriage on which said bearings are mounted, rotatable cutters operated by each of said counter shafts, means for rotating said bearings about the main shaft, a vertically disposed lifting screw for moving said carriage vertically having a bevel gear at its lower end, a hand operated gear at the upper portion of the machine and a connecting shaft for conveying power from said hand operated gear to the gear on the lower end of said lifting screw.

10. In a wood working machine, the combination of a main shaft, and a main gear thereon, a counter shaft at right angles thereto, having a gear on its inner end engaging said main gear, connected bearings for said shafts, a pinion on the outer end of said counter shaft, a cutter arbor parallel with said counter shaft, gearing connecting said pinion with said arbor, a cutter on said arbor connecting bearings and means for rotating said arbor and counter shaft about the main shaft as a center.

11. In a wood working machine, the combination of a main shaft, a bearing therefor, a main bevel gear thereon, a double counter shaft extending across the end of the main shaft, a pair of auxiliary bevel gears secured to said double counter shaft, a sleeve for bringing said auxiliary bevel gears separately into engagement with the main bevel gear, a cutter arbor parallel to said counter shaft, a bearing for the same opposite each end of said double counter shaft, a pinion on said counter shaft, gearing connecting the same with said arbor, a cutter head on said arbor and means for sliding said sleeve to engage either of said auxiliary bevel gears with the main gear to reverse the motion of the cutter head.

12. In a wood working machine, the combination of a table, a main shaft, a main gear thereon, a pair of counter shafts having a pair of auxiliary gears on their inner ends adapted to separately engage said main gear, a tool arbor parallel to each counter shaft and geared thereto, rotary cutters on each arbor, the two arbors being on opposite sides of the counter shafts, the bearings of the main and counter shafts being connected together and means for rotating them on said main shaft as a center whereby either of said rotary cutters may be brought to the desired level above the table.

13. In a wood working machine, the combination of a main shaft, a main bevel gear thereon, a double counter shaft extending across the end of said main shaft, a pair of auxiliary bevel gears on said double counter shaft for separately engaging said main bevel gear, means for moving said double counter shaft longitudinally to bring one or the other of said auxiliary bevel gears into engagement with the main gear, a tool bracket at each end of said double counter shaft, a pinion in each of said brackets having a clutch member, a tool arbor operated by each of said pinions and a clutch member on each counter shaft adapted to engage the clutch member on each pinion separately as the counter shaft slides longitudinally.

FRANK E. THOMES.